United States Patent Office 3,223,823
Patented Dec. 14, 1965

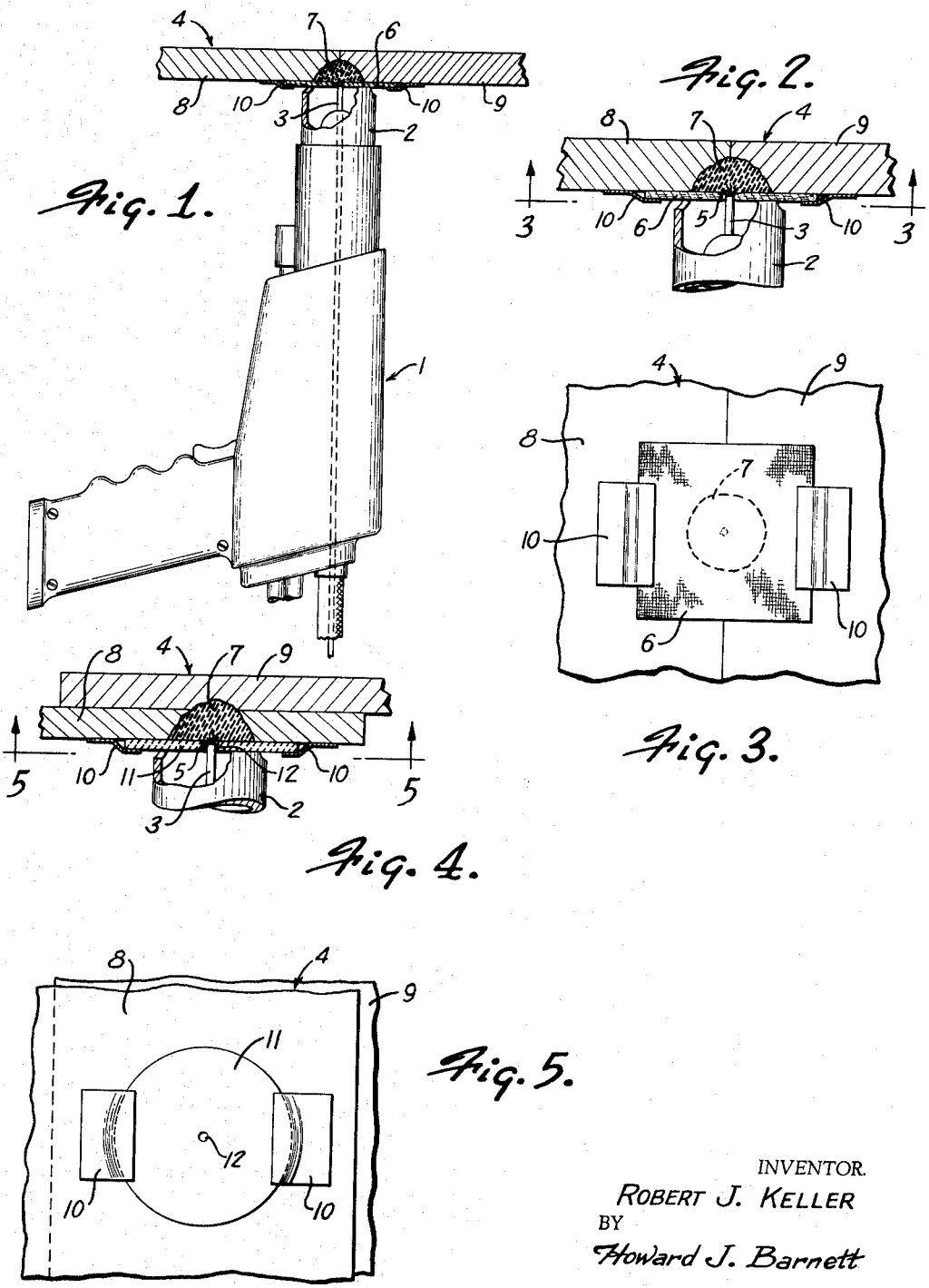

3,223,823
OUT-OF-POSITION BURN-THROUGH
SPOT WELDING
Robert J. Keller, Milwaukee, Wis., assignor to A. O. Smith Corporation, Milwaukee, Wis., a corporation of New York
Filed July 24, 1963, Ser. No. 297,410
9 Claims. (Cl. 219—127)

This invention is directed to out-of-position, consumable electrode, burn-through spot welding and, more specifically to the use of a porous, insulating patch interposed between the arc welding gun and the workpiece so that the electrode actually extends through the patch and the molten weld metal is held in place by the patch until it solidifies. The patch is selected from materials such as filamentous or woven synthetic fibers, woven or filamentous glass and asbestos, and a dielectric, perforate wafer material.

In prior out-of-position welding techniques, it has been difficult to prevent the molten metal from sagging or falling out of the weld. One solution that has been proposed is to reduce the voltage to produce only "quasi-arc" conditions. The advantages of the "quasi-arc" method are limited, especially where good fusion is required between two parts of a load bearing structure, such as a fabricated metal tank for the storage of fluids, a ship's hull, a structural steel building, or a bridge. In most of the above examples, it is difficult or impossible to do all welding in a down-hand position.

This invention provides a relatively simple means for facilitating out-of-position burn-through spot welding by holding the molten weld metal in position until it has solidified. The holding means is porous, and the electrode extends right through it. The shielding gas also penetrates through the porous holding means and surrounds the arc to provide adequate protection to prevent oxidation of the weld metal.

The patch material which is used for the practice of the invention includes porous insulating materials such as woven and filamentous fibers of glass, asbestos and certain synthetics which have a good resistance to the heat of the arc. As described below, a perforated ceramic wafer may also be used. The particular material used should be a dielectric, and should be sufficiently porous to permit the passage of the electrode therethrough. If it is not a porous material, as in the case of a ceramic wafer, an opening must be provided through the material to allow passage therethrough of the electrode. In all cases, the material is preferably non-combustible so that it will remain in place over the weld long enough to permit the weld to solidify.

The drawing furnished herewith illustrates the best mode presently contemplated of carrying out the invention.

In the drawing:

FIGURE 1 is a plan view of a burn-through spot welding gun showing the method of the invention;

FIG. 2 is an enlarged detail of part of FIGURE 1 to illustrate the damming action of the back up patch;

FIG. 3 is a view taken on line 3—3 of FIG. 2 with the welding gun omitted for clarity;

FIG. 4 is an enlarged detail of part of a burn-through spot welding apparatus showing the use of a perforated ceramic seal; and FIG. 5 is a view taken on line 5—5 of FIG. 4 with the welding apparatus omitted.

In the drawings, a burn-through spot welding gun 1 is shown having a nozzle 2, and through which an electrode 3 extends toward a workpiece 4 to form an arc 5.

Interposed between the workpiece 4 and the gun 1 is a woven fiber glass patch 6, as shown in FIGURES 1 and 2. As can best be seen in FIG. 2, the electrode 3 actually penetrates through the patch 6 to form a weld deposit 7 on the workpiece 4. In the embodiment shown, workpiece 4 comprises two metal plates 8 and 9 which are butted against each other. The weld deposit 7 is disposed between their adjacent edges to permanently fuse them together at this point.

Other types of burn-through spot welds can also be made using the method of the invention. For example, the plates 8 and 9 could form an overlapping joint, or a right angle joint. In the case of a fillet weld or a right angle joint, the shape of the patch 6 is modified to conform to the contour of the surface adjacent the weld area. The patch 6 is held in place by any convenient means, such as an adhesive tape 10, as shown in the drawings.

Another type of welding means for the molten weld metal is shown in FIGS. 4 and 5 of the drawings. A ceramic wafer 11 having an opening 12 therein is shown. The electrode 3 extends through the opening 12 to form an arc with the workpiece 4. The wafer 11 is also held in place by means of adhesive tape 10.

The woven fiber glass patch 6 and the ceramic wafer 11 function in the same general manner. However, if the wafer 11 has no additional perforations, it may be desirable to coat the surface adjacent the arc with slag forming ingredients to protect the weld deposit 7 from oxidation. A shielding gas is supplied through nozzle 2 to the arc region and provides adequate protection for the weld deposit 7 when the fiber glass patch 6 is employed because the shielding gas penetrates through the patch 6 to displace any atmospheric contaminants.

As mentioned previously, the main function of the patch 6 and the wafer 11 is to hold the weld deposit 7 in out-of-position welding. It is also advantageous to weld some materials out of position where the usual downhand burn-through spot welding results in frequent weld deposit "drop-outs" because the heat input is difficult to control.

Although only the 12 o'clock position is illustrated, the method may also be used to advantage for any out-of-position welding from vertical to overhead. The use of the interposed patch 6 or wafer 11 permits out-of-position burn-through spot welding of thicker gage materials with deeper penetration and better fusion than with prior welding techniques.

Because the damming material is actually disposed between the welding gun 1 and the workpiece 4, there is no possibility of electrode freeze up to the contact tube, which was always a possible problem in the absence of the damming material.

The invention provides a simple and efficient means for effective out-of-position burn-through spot welding. Once the welds have solidified, the damming material may be removed and used again.

Various modes of carrying out the invention are contemplated as being within the scope of the following claims particularly pointing out and distinctly claiming the subject matter which is regarded as the invention.

I claim:

1. A method of out-of-position burn-through spot welding, which includes the steps affixing a fiber patch against a workpiece surface disposed in a plane ranging at an angle of 0° to 90° from the horizontal, disposing a welding gun adjacent the fiber patch, actuating said welding gun to cause a consumable electrode to penetrate through the fiber patch and strike an arc therethrough to said workpiece thereby forming a weld deposit, whereby said fiber patch holds the molten weld deposit in place while it solidifies.

2. The method of claim 1, and including the additional step of introducing a shielding gas to the area surrounding the weld deposit whereby said shielding gas penetrates the fiber patch to protect the molten weld deposit from the atmosphere while cooling.

3. The method of claim 1, in which the fiber patch is a woven asbestos fiber.

4. The method of claim 1, in which the fiber patch comprises filamentous asbestos.

5. The method of claim 1, in which the fiber patch is an insulating material having sufficient resistance to heat to remain intact until the weld deposit has solidified.

6. A method of out-of-position burn-through spot welding, which includes the steps of affixing an insulating wafer against a workpiece surface disposed in a plane ranging at an angle of 0° to 90° from the horizontal, said wafer having an opening therethrough, disposing a welding gun adjacent the insulating wafer, actuating said welding gun to cause a consumable electrode to penetrate through the opening in the insulating wafer, and striking an arc between the electrode and the workpiece to create a molten weld deposit on said workpiece whereby said insulating wafer holds the molten weld deposit in place while it solidifies.

7. The method of claim 6, and including the additional step of introducing a shielding gas to the area surrounding the weld deposit whereby said shielding gas surrounds the insulating wafer to protect the molten weld deposit from the atmosphere while cooling.

8. The method of claim 6, in which the insulating wafer is a dielectric material.

9. The method of claim 6, in which the insulating wafer is a vitreous material.

References Cited by the Examiner

UNITED STATES PATENTS

| | | | |
|---|---|---|---|
| 1,886,643 | 11/1932 | Chapman | 219—74 |
| 3,001,057 | 9/1961 | Hackman et al. | 219—127 |

RICHARD M. WOOD, *Primary Examiner.*